United States Patent
Chang

(10) Patent No.: US 8,169,513 B2
(45) Date of Patent: May 1, 2012

(54) CAMERAS AND DEFECTIVE PIXEL COMPENSATION METHODS FOR IMAGE SENSORS THEREOF

(75) Inventor: Chun-Wen Chang, Sinjhuang (TW)

(73) Assignee: Silicon Motion, Inc., Jhubei (TW)

( * ) Notice: Subject to any disclaimer, the term of this patent is extended or adjusted under 35 U.S.C. 154(b) by 562 days.

(21) Appl. No.: 12/390,271

(22) Filed: Feb. 20, 2009

(65) Prior Publication Data

US 2010/0085450 A1 Apr. 8, 2010

(30) Foreign Application Priority Data

Oct. 3, 2008 (TW) .............................. 97138154 A

(51) Int. Cl.
*H04N 9/64* (2006.01)
(52) U.S. Cl. ........................................ 348/246; 348/247
(58) Field of Classification Search .................. 348/241, 348/246, 247, 250, 222.1; 382/172
See application file for complete search history.

(56) References Cited

U.S. PATENT DOCUMENTS
2009/0040343 A1* 2/2009 Kao .............................. 348/246
* cited by examiner

*Primary Examiner* — Huy K Mai
(74) *Attorney, Agent, or Firm* — Wang Law Firm, Inc.; Li K. Wang

(57) ABSTRACT

A camera with defective pixel compensation is provided. The camera comprises a register and a compensating unit. The compensating unit receives an image datum and a plurality of adjacent image data relating to the image datum and, according to the value installed in the register, the compensator selects a reference datum from the plurality of adjacent image data. When the image datum is greater than the reference datum by a threshold value, the compensating unit modifies the image datum according to the reference datum.

14 Claims, 4 Drawing Sheets

FIG. 2

CAMERAS AND DEFECTIVE PIXEL COMPENSATION METHODS FOR IMAGE SENSORS THEREOF

CROSS REFERENCE TO RELATED APPLICATIONS

This application claims priority of Taiwan Patent Application No. 097138154, filed on Oct. 3, 2008, the entirety of which is incorporated by reference herein.

BACKGROUND OF THE INVENTION

1. Field of the Invention

The present invention relates to cameras, and in particular relates to defective pixel compensation techniques for image sensors of the cameras.

2. Description of the Related Art

In digital cameras, the image sensors are typically realized by electronic devices like Charge Coupled Devices (CCDs) or CMOS active-pixel sensors.

The image sensors may have defective pixels. The defective pixels may be pixels with current leakage or pixels with open circuits. The pixel with current leakage is hot pixel, wherein the sensed datum is brighter than the actual value. The pixel with open circuit is dead pixel, wherein the sensed datum is darker than the actual value.

Mitigating the defective pixel problems of image sensors are an important issue to people skilled in the art.

BRIEF SUMMARY OF THE INVENTION

The invention provides cameras and defective pixel compensation methods for image sensors of the cameras.

An exemplary embodiment of the cameras of the invention comprises a register and a compensating unit. The compensating unit receives an image datum and a plurality of adjacent image data near the image datum. According to a value stored in the register, the compensating unit selects a first reference datum from the plurality of adjacent image data. The compensating unit modifies the image datum based on the first reference datum when magnitude of the image datum is greater than the magnitude of the first reference datum by a first threshold value.

In another exemplary embodiment of the cameras of the invention, the compensating unit further sorts the plurality of adjacent image data according to the magnitude thereof, and sets the non-maximum adjacent image data to be candidate data. When the value stored in the register correlates to a multiple defective pixel mode, the compensating unit selects the first reference datum from the candidate data according to the value of the register.

The aforementioned techniques solve the hot pixel problem. The invention further discloses compensation techniques for the dead pixel problem. In another exemplary embodiment of the cameras of the invention, the compensating unit sets the non-minimum adjacent image data to be candidate data. When the value stored in the register correlates to a multiple defective pixel mode, the compensating unit selects a second reference datum from the candidate data according to the value of the register. In cases, where the magnitude of the image datum is smaller than the magnitude of the second reference datum by a second threshold value, the compensating unit modifies the image datum according to the second reference datum.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2 illustrates an image frame in the RGB format;

DETAILED DESCRIPTION OF THE INVENTION

The following description show several exemplary embodiments of the invention. This description is made for the purpose of illustrating the general principles of the invention and should not be taken in a limiting sense. The scope of the invention is best determined by reference to the appended claims.

Figure 1:
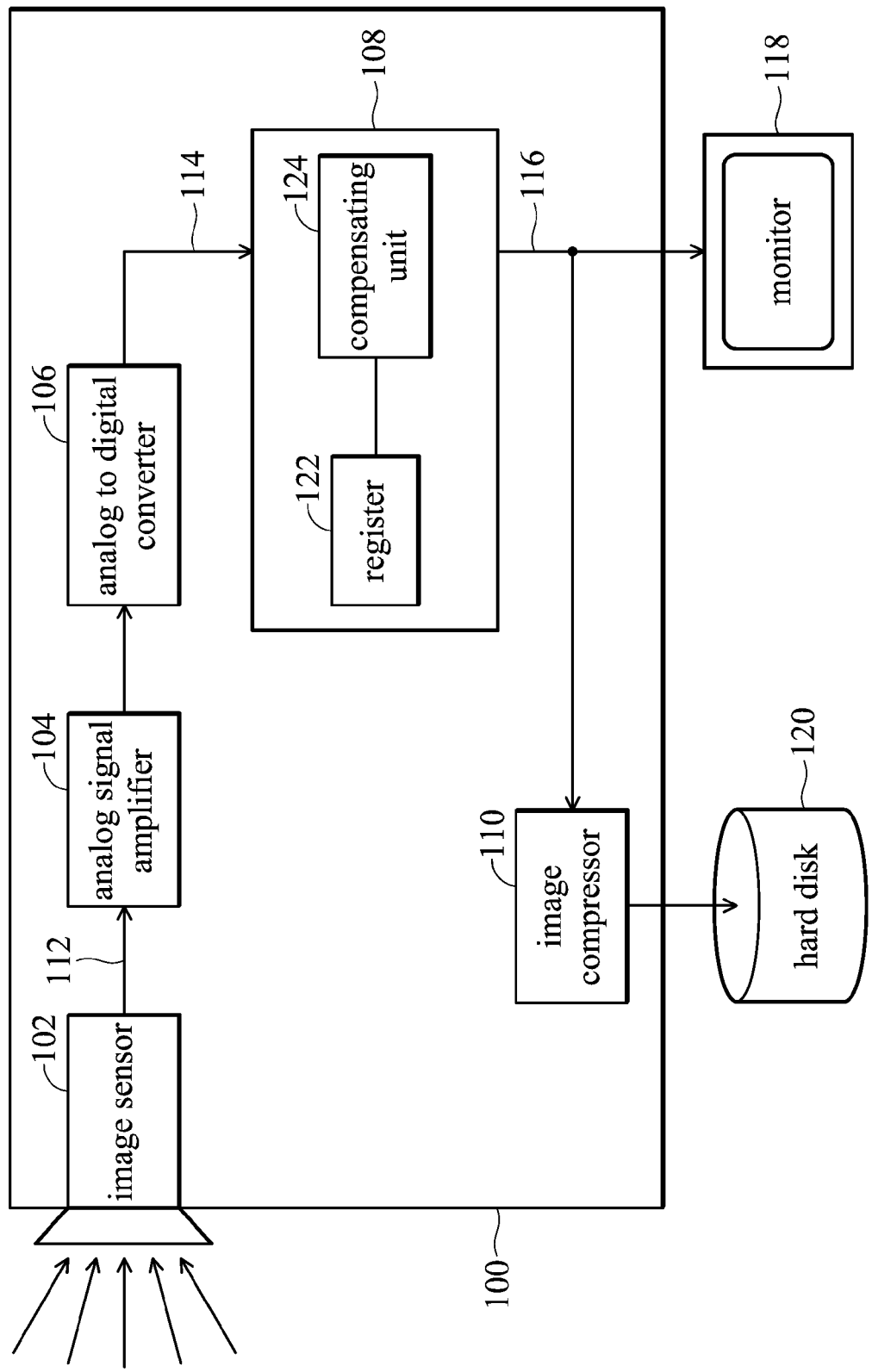
FIG. 1 depicts an exemplary embodiment of cameras of the invention.

FIG. 1 depicts an exemplary embodiment of cameras of the invention. Camera 100 comprises an image sensor 102, an analog signal amplifier 104, an analog to digital converter (ADC) 106, an image processing unit 108 and an image compressor 110. The image sensor 102, realized by a Charge Coupled Device (CCD) or a CMOS active-pixel sensor and so on, senses the light information. The analog signal amplifier 104 amplifies the signal sensed by the image sensor 102 and sends the amplified signal to the analog-to-digital converter 106 to be transformed to a digital image 114 of a first format. The image processing unit 108 transforms the first format digital image 114 to a second format digital image 116. The second format digital image 116 may be displayed in a monitor 118, or be stored in a hard disk 120 after being compressed by the image compressor 110.

As shown in FIG. 1, the image processing unit 108 comprises a register 122 and a compensating unit 124. Magnitude of the image datum sensed by defective pixels of the image sensor 102 may be too high or too low. The compensating unit 124 is operative to modify the sensed result of the defective pixels. The value stored in the register 122 may be installed during the manufacture of the camera 100. The compensating unit 124 may perform defective pixel compensation according to the value stored in the register 122.

Figure 2:
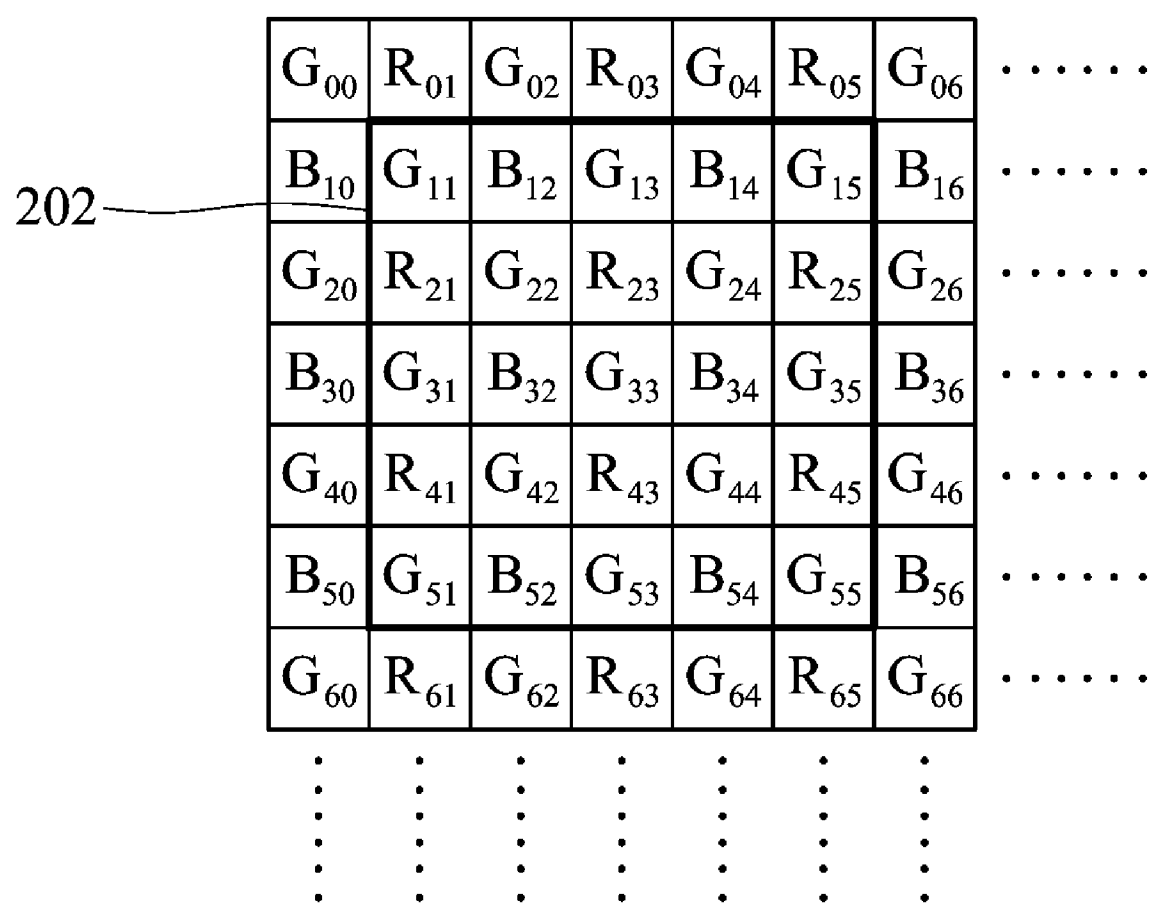

The digital image 114 may be in a RGB format. FIG. 2 illustrates an image frame in the RGB format. As shown, there are image data of red $R_{ij}$, image data of green $G_{ij}$ and image data of blue $B_{ij}$, where indexes i and j show the positions of the image data. For defective pixel compensation, the compensating unit 124 uses a sampling pattern to collect adjacent image data of each image datum. For example, the following example uses a sampling pattern including 5×5 pixels.

Considering the image datum $G_{33}$, the corresponding 5×5 sampling pattern is labeled 202. In addition to the green image datum $G_{33}$, the pattern 202 further includes green image data $G_{11}$, $G_{13}$, $G_{15}$, $G_{22}$, $G_{24}$, $G_{31}$, $G_{35}$, $G_{42}$, $G_{44}$, $G_{51}$, $G_{53}$ and $G_{55}$ which are named "plurality of adjacent image data" relating to the image datum $G_{33}$. After collecting all the green image data in the sampling pattern 202, the compensating unit 124 selects one from the plurality of adjacent image data $G_{11}$, $G_{13}$, $G_{15}$, $G_{22}$, $G_{24}$, $G_{31}$, $G_{35}$, $G_{42}$, $G_{44}$, $G_{51}$, $G_{53}$ and $G_{55}$ to be a first reference datum, wherein the selection is based on the value of the register 122. The compensating unit 124 refreshes the green image datum $G_{33}$ according to the first reference datum when the green image datum $G_{33}$ is greater than the first reference datum and the difference between the green image datum $G_{33}$ and the first reference datum is greater than a first threshold value. For example, refreshing the image datum may be realized by replacing the image datum $G_{33}$ by the first reference datum. The aforementioned techniques solve the hot pixel problem.

In some exemplary embodiments of the invention, the compensating unit 124 sorts the plurality of adjacent image data $G_{11}, G_{13}, G_{15}, G_{22}, G_{24}, G_{31}, G_{35}, G_{42}, G_{44}, G_{51}, G_{53}$ and $G_{55}$ by their magnitude. From low to high, the plurality of adjacent image data are sorted to be $P_{min}, P_{min+1} \ldots P_{max-1}$ and $P_{max}$. The image datum to be processed (such as the image datum $G_{33}$) is stored as a variable PUT. When the value stored in the register 122 represents a single defective pixel mode, the compensating unit 124 may set the datum $P_{max}$ as the first reference datum. When the value stored in the register 122 represents a multiple defective pixels mode, the compensating unit 124 may set the datum $P_{max-1}$ as the first reference datum.

In some exemplary embodiments of cameras of the invention, the register 122 may be set to the multiple defective pixels mode by more than one value. In the multiple defective pixels mode, datum $P_{min}, P_{min+1} \ldots P_{max-1}$ are candidate data for the first reference datum, and the selection of the first reference datum is dependent on the value of the register 122, wherein the value installed in the register 122 is dependent on the quality of the image sensor 102. When there are more defective pixels in the image sensor 102, the value installed in the register 122 sets the compensating unit 124 to select the lower candidate datum to be the first reference datum. For example, when the image sensor 102 is of acceptable quality, manufacturers may set the value stored in the register 122 to the single defective pixel mode to take the datum $P_{max}$ as the first reference datum. When the image sensor 102 has a small amount of defective pixels, manufacturers may set the register 122 to correlate to the multiple defective pixels mode, wherein the value of the register 122 may be set to direct the compensating unit 124 to select datum $P_{max-1}$ to be the first reference datum. When the sensing quality of the image sensor 102 is unsatisfactory, manufacturers may set the register 122 to correlate to the multiple defective pixels mode, wherein the value of the register 122 may be set to direct the compensating unit 124 to select the datum $P_{max-2}$ or even the smaller datum (such as datum $P_{max-3}$, or $P_{max-4} \ldots$) to be the first reference datum.

In addition to hot pixel compensation techniques, the invention further discloses dead pixel compensation techniques. To compensate for dead pixels in the image sensor 102, the compensating unit 124 selects one of the plurality of adjacent image data as a second reference datum. When the magnitude of the image datum PUT is smaller than the second reference datum and the difference between the second reference datum and the image datum PUT is greater than a second threshold value, the compensating unit 124 refreshes the image datum PUT according to the second reference datum. For example, refreshing image datum may be realized by replacing the image datum PUT by the second reference datum.

When the value of the register 122 is the single defective pixel mode, the compensating unit 124 may select datum $P_{min}$ to be the second reference datum. When the value of the register 122 correlates to the multiple defective pixels mode, the compensating unit 124 may select datum $P_{min+1}$ to be the second reference datum.

In some exemplary embodiments, the register 122 may set to the multiple defective pixels mode by more than one value and the compensating unit 124 regards the data $P_{min+1} \ldots P_{max-1} \ldots P_{max}$ as candidate data for the second reference datum. In this case, the selection of the second reference datum is dependent on the value of the register 122, and the value installed in the register 122 is dependent on the sensing quality of the image sensor 102. When there are more defective pixels in the image sensor 102, the value installed in the register 122 sets the compensating unit 124 to select the greater candidate datum to be the second reference datum. For example, when the image sensor 102 is of acceptable sensing quality, manufacturers may set the value stored in the register 122 to the single defective pixel mode to take the datum $P_{min}$ as the second reference datum. When the image sensor 102 has a small amount of defective pixels, manufacturers may set the register 122 to correlate to the multiple defective pixels mode, wherein the value of the register 122 may be set to direct the compensating unit 124 to select datum $P_{min+1}$ to be the second reference datum. When the sensing quality of the image sensor 102 is unsatisfactory, manufacturers may set the register 122 to correlate to the multiple defective pixels mode, wherein the value of the register 122 may be set to direct the compensating unit 124 to select the datum $P_{miN+2}$ or even the greater datum (such as datum $P_{min+3}$, or $P_{min+4} \ldots$) to be the second reference datum.

Figure 3:
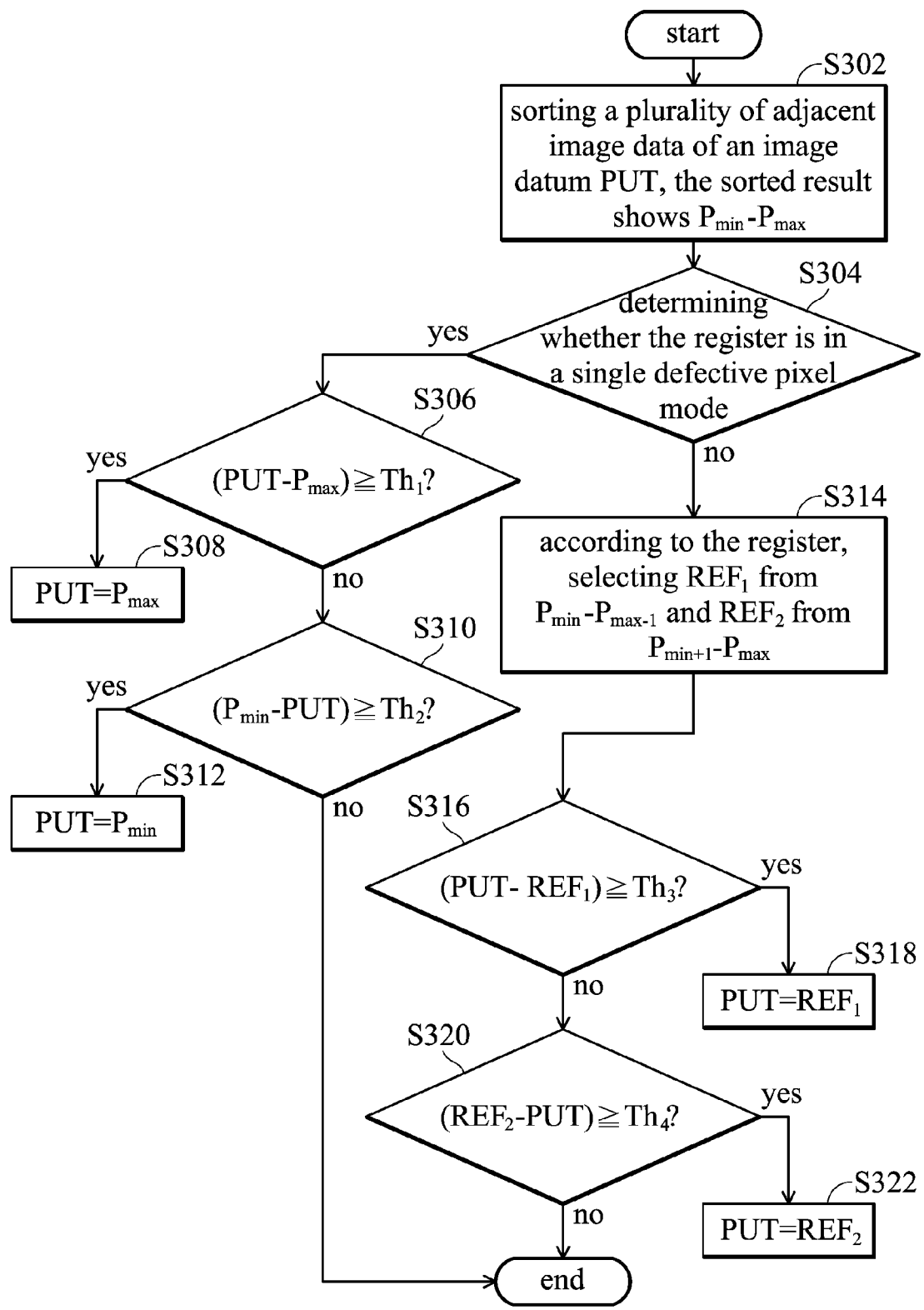
FIG. 3 shows a flowchart of an exemplary embodiment of image sensor compensation.

FIG. 3 shows a flowchart of an exemplary embodiment of image sensor compensation. The fabricator may set a register of the camera during the manufacturing procedure. The value installed in the register 122 reflects the quality of the image sensor. To perform defective pixel compensation on an image datum PUT, adjacent image data relating to the image datum PUT and the image datum PUT itself are collected before the step S302. In step S302, the collected adjacent image data are sorted by their magnitude. From low to high, the sorted data are $P_{min}-P_{max}$. In step S304, the register is read out for determining whether the value installed in the register correlates to a single defective pixel mode or a multiple defective pixels mode. When the value of the register correlates to the single defective pixel mode, the flowchart enters step S306. In step S306, the value of (PUT$-P_{max}$) is compared with a threshold value Th$_1$. When the value of (PUT$-P_{max}$) is greater than the threshold value Th$_1$, the compensation technique of the invention may modify the image datum PUT according to datum $P_{max}$. As shown in step S308, the image datum PUT may be replaced by datum $P_{max}$ (PUT=$P_{max}$). On the contrary, when the value of (PUT$-P_{max}$) is lower than the threshold value Th$_1$, the compensation technique of the invention enters step S310. In step S310, the value of ($P_{min}$-PUT) is compared with a threshold value Th$_2$. When the value of ($P_{min}$-PUT) is greater than the threshold value Th$_2$, the compensation technique of the invention may modify the image datum PUT according to datum $P_{min}$. As shown in step S312, the image datum PUT may be replaced by datum $P_{min}$ (PUT=$P_{min}$).

In cases where the value installed in the register does not correlate to the single defective pixel mode, the compensation technique enters a multiple defective pixels mode. Referring to FIG. 3, the steps S314-S322 correlate to the multiple defective pixels mode. In step S 314, a first reference datum REF$_1$ is selected from the non-maximum adjacent image data $P_{min}$-$P_{max-1}$, and a second reference datum REF$_2$ is selected from the non-minimum adjacent image data $P_{min+1}$-$P_{max}$. In step S316, the value of (PUT-REF$_1$) is compared with a threshold value Th$_3$. When the value of (PUT-REF$_1$) is greater than the threshold value Th$_3$, the compensation technique of the invention may modify the image datum PUT according to the first reference datum REF$_1$. As shown in step S318, the image datum PUT may be replaced by the first reference datum $REF_1$ ($PUT=REF_1$). On the contrary, when the value of ($PUT-REF_1$) is lower than the threshold value $Th_3$, the compensation technique of the invention enters step S320. In step S320, the value of ($REF_2-PUT$) is compared with a threshold value $Th_4$. When the value of ($REF_2-PUT$) is greater than the threshold value $Th_4$, the compensation technique of the invention may modify the image datum PUT according to datum $REF_2$. As shown in step S322, the image datum PUT may be replaced by datum $REF_2$ ($PUT=REF_2$).

In the flowchart shown in FIG. 3, the steps S306 and S316 are for hot pixel compensation, and the steps S310 and S320 are for dead pixel compensation. The threshold values $TH_1$–$Th_4$ may be set by the fabricator. The modification operations of steps S308, S312, S318 and S322 may be replaced by other mathematical operations. Furthermore, some embodiments may only realize part of the steps S306, S310, S316 and S320. In some embodiments, only hot pixel compensation is implemented. In some embodiments, only dead pixel compensation is implemented.

Figure 4:
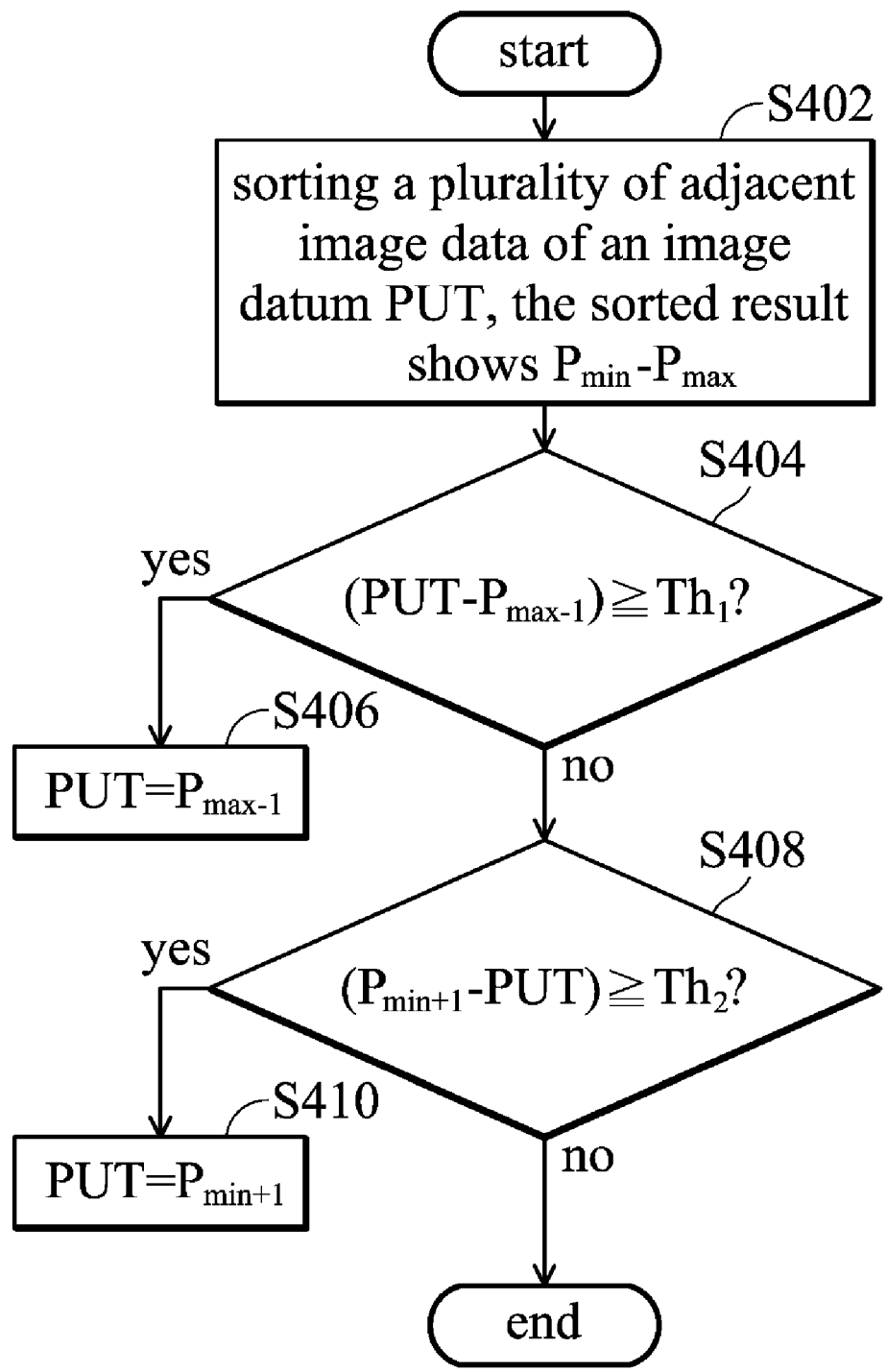
FIG. 4 shows a flowchart of another image sensor compensation method of the invention.

FIG. 4 shows a flowchart of another image sensor compensation method of the invention. Compared to the aforementioned techniques, FIG. 4 shows a technique in which no register is required. In this embodiment, the image data $P_{min+1}$ and $P_{max-1}$ play the roles of the aforementioned first and second reference data. The image datum PUT and adjacent image data relating to the image datum PUT are collected before the step S402. In step S402, the collected adjacent image data are sorted by their magnitude. From low to high, the sorted data are $P_{min}$–$P_{max}$. In step S404, the value of ($PUT-P_{max-1}$) is compared with a threshold value $Th_1$. When the value of ($PUT-P_{max-1}$) is greater than the threshold value $Th_1$, the compensation technique of the invention may modify the image datum PUT according to datum $P_{max-1}$. As shown in step S406, the image datum PUT may be replaced by datum $P_{max-1}$ ($PUT=P_{max-1}$). On the contrary, when the value of ($PUT-P_{max-1}$) is lower than the threshold value $Th_1$, the compensation technique of the invention enters step S408. In step S408, the value of ($P_{min+1}-PUT$) is compared with a threshold value $Th_2$. When the value of ($P_{min+1}-PUT$) is greater than the threshold value $Th_2$, the compensation technique of the invention may modify the image datum PUT according to datum $P_{min+1}$. As shown in step S410, the image datum PUT may be replaced by datum $P_{min+1}$ ($PUT=P_{min+1}$).

In the flowchart shown in FIG. 4, the step S404 is for hot pixel compensation and the step S408 is for dead pixel compensation. The threshold values $Th_1$ and $Th_2$ may be set by the fabricator. The modification operations of steps S406 and S410 may be replaced by other mathematical operations. In some embodiments, only hot pixel compensation (including steps S404 and S406) is implemented. In some embodiments, only dead pixel compensation (including steps S408 and S410) is implemented.

The sampling pattern disclosed in the invention is not limited to a 5×5 pixel pattern (referring to pattern 202 of FIG. 2). The sampling pattern may be realized in other shapes and sizes.

Furthermore, the aforementioned image data are not limited to the RGB format. In additional to the RGB format, the image data may be of YUV format or any other image format.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera, comprising:
an image sensor;
a register storing a value reflecting the quality of the image sensor; and
a compensating unit coupled to the image sensor and the register, wherein the compensating unit receives an image datum and a plurality of adjacent image data relating to the image datum, selects a first reference datum from the plurality of adjacent image data according to the value stored in the register, and modifies the image datum according to the first reference datum when the magnitude of the image datum is greater than the magnitude of the first reference datum by a first threshold.

2. The camera as claimed in claim 1, wherein the compensating unit selects the second maximum of the plurality of adjacent image data to be the first reference datum when the value stored in the register correlates to a multiple defective pixels mode.

3. The camera as claimed in claim 1, wherein the compensating unit further sorts the plurality of adjacent image data according to magnitude thereof and setting the non-maximum adjacent image data to be candidate data.

4. The camera as claimed in claim 3, wherein the compensating unit selects the first reference datum from the candidate data when the value stored in the register correlates to a multiple defective pixels mode, and the value of the register determines how the first reference datum from the candidate data is selected.

5. The camera as claimed in claim 1, wherein the compensating unit further selects a second reference datum from the plurality of adjacent image data, wherein the selection of the second reference datum is dependent on the value stored in the register and, when the magnitude of the image datum is lower than the magnitude of the second reference datum by a second threshold value, the compensating unit modifies the image datum according to the second reference datum.

6. The camera as claimed in claim 5, wherein the compensating unit selects the second minimum of the plurality of adjacent image data to be the second reference datum when the value stored in the register correlates to a multiple defective pixels mode.

7. The camera as claimed in claim 5, wherein the compensating unit further sorts the plurality of adjacent image data according to magnitude thereof and setting the non-minimum adjacent image data to be candidate data.

8. The camera as claimed in claim 7, wherein the compensating unit selects the second reference datum from the candidate data when the value stored in the register correlates to a multiple defective pixels mode, and the value of the register determines how the second reference datum from the candidate data is selected.

9. A defective pixel compensation method for an image sensor, comprising:
providing a camera with a register storing a value reflecting the quality of the image sensor, the camera comprising the image sensor;
using the image sensor to sense light information and thereby obtaining an image datum and a plurality of adjacent image data relating to the image datum;
selecting a first reference datum from the plurality of adjacent image data according to the value stored in the register; and modifying the image datum according to the first reference datum when the magnitude of the image datum is greater than the magnitude of the first reference datum by a first threshold value, to compensate for hot pixel problems of the image sensor.

10. The defective pixel compensation method as claimed in claim 9, wherein selecting the first reference datum further comprises:

selecting the second maximum of the plurality of adjacent image data to be the first reference datum when the value stored in the register correlates to a multiple defective pixels mode.

11. The defective pixel compensation method as claimed in claim 9, further comprising:

sorting the plurality of adjacent image data according to magnitude thereof and setting the non-maximum adjacent image data to be candidate data; and selecting the first reference datum from the candidate data according to the value stored in the register when the value stored in the register correlates to a multiple defective pixels mode.

12. The defective pixel compensation method as claimed in claim 9, further comprising:

selecting a second reference datum from the plurality of adjacent image data according to the value stored in the register; and modifying the image datum according to the second reference datum when the magnitude of the image datum is lower than the magnitude of the second reference datum by a second threshold value, to compensate for dead pixel problems of the image sensor.

13. The defective pixel compensation method as claimed in claim 12, wherein selecting the second reference datum further comprises:

selecting the second minimum of the plurality of adjacent image data to be the second reference datum when the value stored in the register correlates to a multiple defective pixels mode.

14. The defective pixel compensation method as claimed in claim 12, further comprising:

sorting the plurality of adjacent image data according to magnitude thereof and setting the non-minimum adjacent image data to be candidate data;

selecting the second reference datum from the candidate data according to the value stored in the register when the value stored in the register correlates to a multiple defective pixels mode.

* * * * *